United States Patent

[11] 3,632,958

| [72] | Inventor | Robert B. Width<br>Rochester, Mich. |
| [21] | Appl. No. | 107,270 |
| [22] | Filed | Jan. 18, 1971 |
| [45] | Patented | Jan. 4, 1972 |
| [73] | Assignee | Tuffaloy Products, Inc.<br>Detroit, Mich. |

[54] ELECTRODE HOLDER
11 Claims, 9 Drawing Figs.

| [52] | U.S. Cl. | 219/120, 219/119 |
| [51] | Int. Cl. | B23k 9/24 |
| [50] | Field of Search | 219/119, 120 |

[56] References Cited
UNITED STATES PATENTS

| 2,068,043 | 1/1937 | Warnke | 219/119 |
| 2,914,652 | 11/1959 | Hall et al. | 219/120 |

*Primary Examiner*—C. L. Albritton
*Attorney*—William T. Sevald

ABSTRACT: An electrode holder which conducts welding current from a platen via a base, a hollow body, and a spindle in the body. The spindle has an electrode tip socket in its outer end. This eliminates shunt cables. The spindle is axially moveable and has a head inside the body abutting a flange on the body. A split-ring jam-collar abuts the head and a spring forces the jam-collar into current-carrying contact with both the head and the body. The collar and head have camming surfaces to move the ring radially against the body. By using a spring to suit the work, preloading the spring, and calculating added load to move the spindle axially, the force of contact at the workpiece can be controlled to make good welding contact and to not damage the tip or work. The length of inward travel of the spindle in conjunction with the strength of the spring and preload gives an accurate measure of applied load. Two or more such holders on a platen may be used with the springs compensating differences in spacing and in workpieces.

PATENTED JAN 4 1972
3,632,958
SHEET 1 OF 2
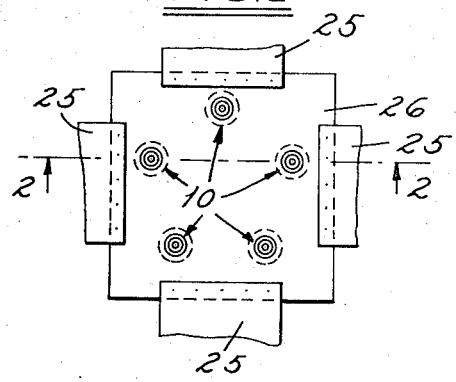
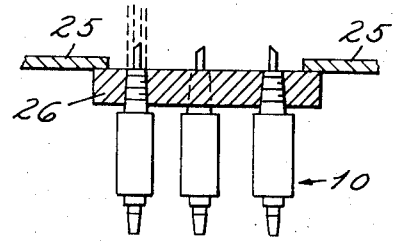
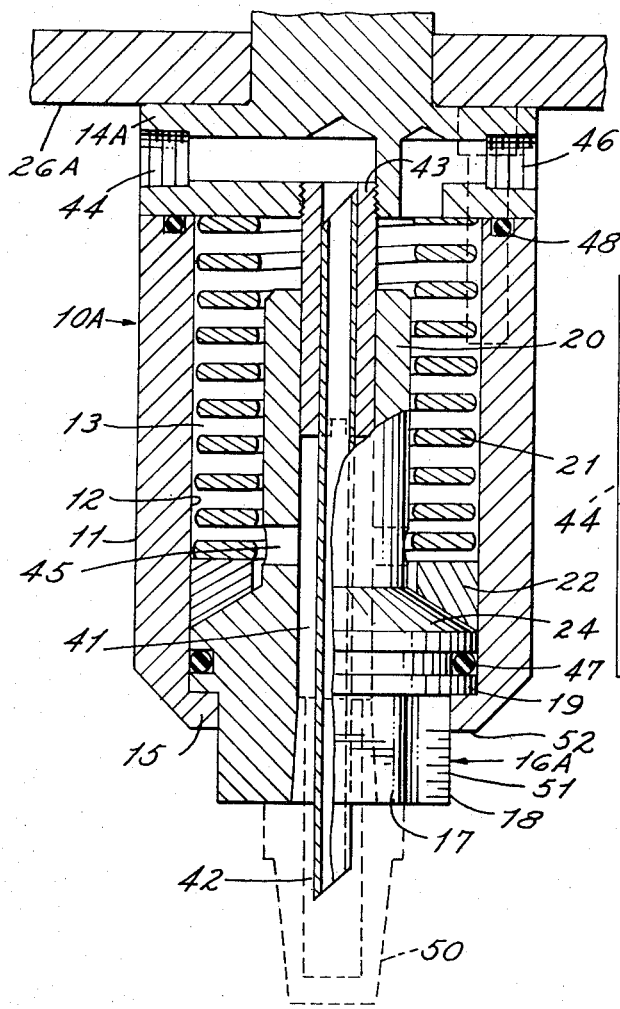
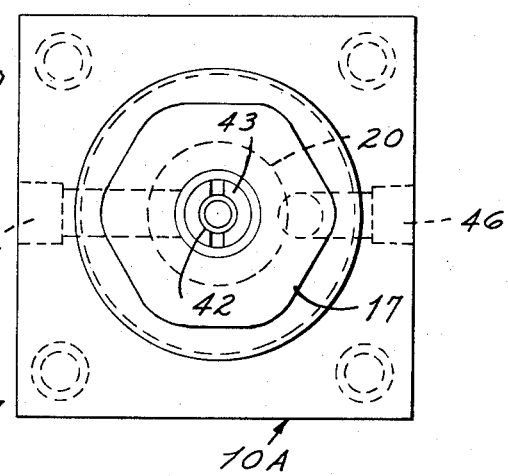
INVENTOR
ROBERT B. WIDTH
BY
ATTORNEY

PATENTED JAN 4 1972

INVENTOR
ROBERT B. WIDTH

BY William P. Sewall

ATTORNEY

ELECTRODE HOLDER

This invention relates to an improved holder for welding electrodes.

An object of the invention is to provide a spring-loaded holder which eliminates shunt cables and improves welds especially in multiple, by insuring a known force of contact between the work and the tip which may be adjusted to suit the work by adjusting machine travel.

An object of the invention is to provide a holder which has an axially movable tip-holding spindle abutted by the spring which resiliently urges the electrode into contact with the workpiece to prevent damage to the tip and to the workpiece.

An object of the invention is to provide a spring-pressed engagement between the electrode tip and the workpiece so that spindle travel distance inwardly against a spring of known strength gives a known force of engagement additive to the preload on the spring.

An object of the invention is to provide a split-ring jam-collar between the spindle and the body with the spring axially urging the collar into electrical contact with the spindle and the radial camming surfaces between the jam-collar and the spindle head urging the jam-collar radially outwardly into electrical contact with the body.

An object of the invention is to provide a holder which conducts current without a shunt cable so that a plurality of holders may be mounted on a platen without shunt cable interference.

An object of the invention is to provide a holder which is resiliently forced into welding engagement so that when a plurality of holders are mounted on a platen, differences in spacing and in workpieces are compensated to insure good welding contact.

An object of the invention is to provide an electrode holder which is simple in design and construction, inexpensive to manufacture, easy to mount and to use, and which is easily adjusted as to force of contact by adjusting the travel of the welding machine and/or using springs of selected strength.

These and other objects of the invention will become apparent by reference to the following description of an electrode tip holder embodying the invention taken in connection with the accompanying drawings, in which:

FIG. 1 is a top plan view of a platen and shunt connections, with the shunts broken away, and showing the attached ends of electrode holders for the top.

FIG. 2 is a cross-sectional view of the assembly seen in FIG. 1 taken on the line 2—2 thereof and showing the electrode holders in elevation.

FIG. 3 is an enlarged cross-sectional view of an electrode holder mounted on a platen, with parts broken away, and illustrating one type of mounting base.

FIG. 4 is a bottom plan view of the holder seen in FIG. 3 with the platen deleted.

Figure 5:
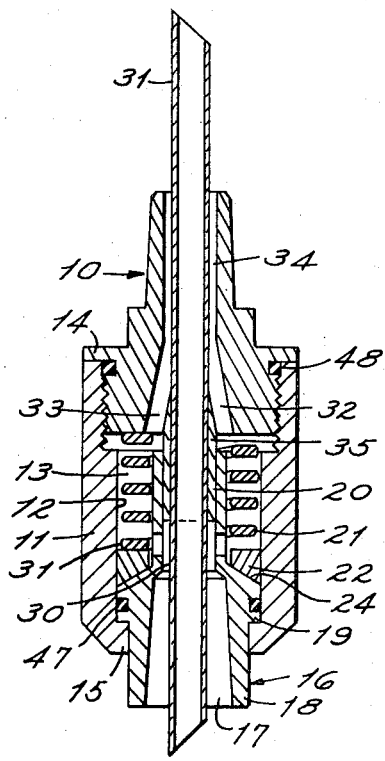
FIG. 5 is an enlarged cross-sectional view of an electrode holder of the type shown in FIG. 2.

Referring now to the drawings wherein like numerals refer to like and corresponding parts throughout the several views, the electrode holders 10, 10A, and 10B shown therein to illustrate the invention comprise a body 11 having an internal wall 12 defining an axial bore 13. A base 14, 14A, and 14B closes one end of the bore 13. An internal radial flange 15 on the other end of the body 11 overlaps the bore 13.

A spindle 16, 16A, and 16B lies in the bore 13 and has an electrode socket 17, a nose 18 extending through the flange 15, a head 19 abutting the flange 15, and a hollow stem 20. A spring 21 abuts the base 14, 14A and 14B at one end of the spring. A split-ring jam-collar 22 lies between the other end of the spring 20 and the head 19. The spring 21 is selected as to desired strength. When the holder 10 is assembled, the spring is compressed as needed to provide a suitable preload. The jam-collar 22 and/or the head 19 has a tapered radial cam surface 23 and 24 respectively.

Figure 6:
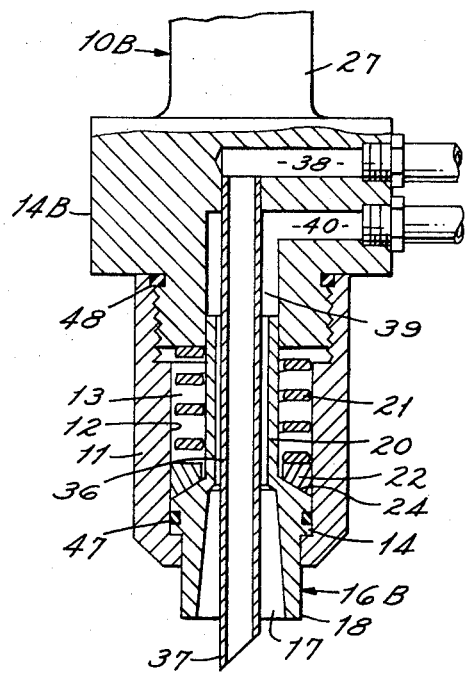
FIG. 6 is a cross-sectional view of an electrode holder showing another type of base for mounting.
Figure 7:
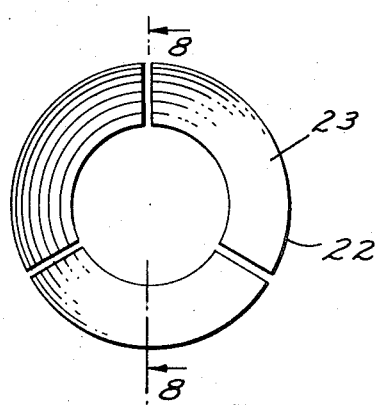
FIG. 7 is an enlarged top plan view of a preferred embodiment of the jam-collar.
Figure 8:
FIG. 8 is a cross-sectional view of the jam-collar seen in FIG. 7 taken on the line 8—8 thereof.
Figure 9:
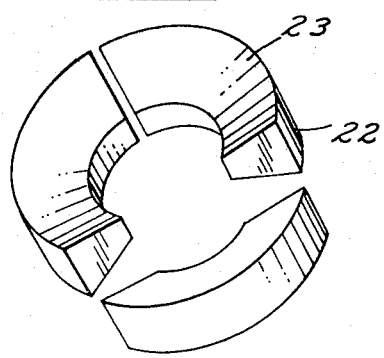
FIG. 9 is a perspective view of the jam-collar seen in FIGS. 7 and 8 with one segment outset to illustrate shape and construction.

Shunt cables 25 are connected to a platen 26, FIGS. 1 and 2; to a platen 26A, FIGS. 3 and 4; and/or to a post 27, FIG. 6. This connects the welding circuit to the body 11 by its connection to the base 14, 14A, and 14B.

The welding circuit is transferred from the body 11 to the spindle 16 by the jam-collar 22 in conjunction with the force exerted by and/or against the spring 21. The jam-collar 22 is forced axially by or against the spring 21 into solid contact with the head 19 on the spindle 16 with the surfaces 23 and 24 engaging one another.

Due to the outward camming action of at least one of the surfaces 23 and 24, the jam-collar 22 is cammed against the internal wall 12 of the body 10 by the force exerted by or against spring 21. As the jam-collar 22 is split or divided into segments, it is free to move radially outwardly against the internal wall 12 around its periphery. The fact that the jam-collar 21 makes solid electrical contact with both the spindle head 19 and the body internal wall 12 during the welding cycle substantially eliminates arcing between the parts. Holders in use reveal no evidence of arcing after over 5,000 welds. Inspection of the welds reveals that there is no channeling of the welding current to one point on the electrode tip but rather that tip is uniformly supplied with current. It was also revealed that the tips had a longer life than when used in conventional holders and that the welds were more uniform from weld to weld.

To fluid-cool the holder, FIG. 5, the spindle 16 has a hollow bore 30. A coolant tube 31 lies in the bore 30. Coolant is circulated down the tube 31 to the tip in the socket 17 and returned in the hollow bore 30 to the radial opening 31, the body bore 13, and the channels 32, 33, and 34 in the base 14. A spacer 35 supports the tube 31 at the spindle 16.

The spindle 16B has a hollow bore 36, FIG. 6. A tube 37 lies in the bore 36 and is fixed in the base 14B in communication with the inlet conduit 35. Return coolant flows from the tip leads through spindle bore 36 to the cavity 39 in the base 14B and through an outlet conduit 40.

The spindle 16A has a hollow bore 41, FIG. 3. A tube 42 is mounted in an extension 43 on the base 14A in communication with an inlet conduit 44. Return flow from the tip 50 is through the spindle bore 41 to the radial opening 45 to the interior of the body bore 13 and through the outlet conduit 46.

The head 19 of each spindle 16, 16A, and 16B is recessed and an O-ring seal 47 seals against fluid leaks at the outer end. The body 11 or bases 14, 14A, and 14B are recessed and an O-ring seal 48 seals against fluid leaks at the inner end.

The nose 18 of the spindle 16, FIG. 3, is scribed with index markings 51. These markings are read against the edge 52 of the flange 15 on the body 11. When the force of advancement of the tip 50 exceeds the preload on the spring 21, the nose is moved into the body 11. The preload on the spring 21 and the distance of inward movement of the nose 18 and spindle 16, 16A, and 16B is the total force exerted by the tip 50 against the work. The following table shows this in detail relative to springs of known strength by industry standards.

| Spring | Pounds per ⅛" movement | Holder pre-load ³⁄₁₆, lbs. | Total load with spring travel, pounds | | | |
|---|---|---|---|---|---|---|
| | | | ⅛ travel | ¼ travel | ⅜ travel | ½ travel |
| M-70 | 112 | 168 | 280 | 392 | 504 | 614 |
| MH-70 | 129 | 193 | 322 | 451 | 580 | 709 |
| MHO-70 | 148 | 222 | 370 | 518 | 666 | 814 |
| H-70 | 275 | 412 | 687 | 962 | 1,237 | 1,512 |
| HX-70 | 477 | 715 | 1,182 | 1,659 | 2,136 | 2,613 |

From the foregoing table it will be understood that a spring 21 may be selected, the desired preload imposed, and that the travel of the welding machine, after the tip 50 has made contact with the work, may be adjusted to suit the total load desired to be imposed on the tip. Here the index markings 51 provide a ready scale for measuring this travel under actual working conditions which, in conjunction with the known strength of the spring 21, such as by using the foregoing table, enables the user to impose the desired load accurately.

The inward movement of the spindle 16, 16A, and 16B, with machine advancement forces the head 19 inwardly away from the flange 15. Upon the actuation of the welding cycle and current passing through the work with resultant melting at the weld, the spring 21 quickly advances the tip 50 in a fast followup to maintain good welding contact with the work until the cycle ends.

While only a few embodiments of the electrode holder of the invention have been showed and described, it will be understood that the scope of the invention is defined by the appended claims.

I claim:

1. An electrode holder for electrical welding comprising a base, a body having an internal wall defining a hollow bore and having opposite ends with a base end mounted on said base and an extending end,
   a flange adjacent said extending end of said body projecting radially in said hollow bore,
   a spindle lying in said hollow bore having a nose projecting axially through said flange outwardly of said body and having a head in said hollow bore for abutting said flange to limit outward movement of said spindle,
   axial force against said nose moving said spindle axially into said body by displacing said head axially inwardly away from said flange;
   said nose having means for mounting an electrode tip;
   said spindle head having a radial surface inside said bore,
   a jam-collar surrounding said spindle having a radial surface abutting said radial surface of said head;
   at least one said radial surface of said jam-collar and said head being tapered to provide radial camming therebetween;
   said jam-collar having a peripheral surface adjacent said internal wall of said body;
   said jam collar being split to allow outward radial expansion of said collar to engage said body internal wall;
   said radial surfaces of said head and collar coacting as a cam to move said jam-collar radially outwardly against said internal wall of said body; and
   a spring in said bore of said body compressible between said base and said jam-collar to urge said jam-collar axially into solid electrical contact with said head and radially into solid electrical contact with said body internal wall through said camming radial surfaces.

2. In a device as set forth in claim 1,
a platen;
said device being mounted on said platen via said base; and
an electric welding circuit cable connected to said platen;
said circuit leading through said device to an electrode tip via said base, body, jam-collar, head, and spindle.

3. In a device as set forth in claim 1,
a platen;
said device being mounted on said platen via said base;
an electric welding circuit cable connected to said platen;
said circuit leading through said device to an electrode tip via said base, body, jam-collar, head, and spindle; and at least
a second device mounted on said platen;
each said spring in each said device in conjunction with advancement of said platen toward a workpiece allowing inward movement of each said spindle relative to the other said spindle when an electrode tip makes contact with a workpiece to provide good electrode tip engagement with a workpiece to reduce variations in welds due to differences in tip extension and differences in tip and workpiece surfaces of one holder relative to the other.

4. In a device as set forth in claim 1, an welding circuit cable connected to said base with said device completing the circuit to an electrode tip held by said spindle via said body, jam-collar, and head.

5. In a device as set forth in claim 1, said flange having at least one key surface at said spindle nose; said spindle nose having a complementary surface axially slidable engaging said key surface; said surfaces preventing rotational movement of said spindle in said body to prevent rotational movement of an electrode tip held by said spindle.

6. In a device as set forth in claim 1,
said collar being segmented into two or more segments to substantially eliminate collar resistance to upward radial movement and to provide separate collar segments free to move radially outwardly and/or axially independently of one another in their location to insure overcoming differences, spacing, and tolerances.

7. In a device as set forth in claim 1, said spring being celebrated in strength relative to the workpiece being welded and to the tip employed to provide sufficient force of engagement to insure proper welding and to prevent excess force of engagement to eliminate undue deformation of tip and workpieces in conjunction with advancement of the device by a welding machine.

8. In a device as set forth in claim 1,
said spring being selectable as to strength, preload compression, and additional load with advancement of the holder after contact by an electrode tip with a workpiece.

9. In a device as set forth in claim 8, said nose of said spindle normally projecting beyond the end of said body a known distance under preload of said spring; said nose moving into said body when said spring preload is exceeded by the force of workpiece contact; the distance said nose in moved inward being an indication of the added load imposed at the workpiece and a factor for calculating total load in conjunction with the known strength and characteristics of said spring, 10. In a device as set forth in claim 9,
an index marked on said nose readable relative to said body to measure spindle in-travel of said nose.

11. In a device as set forth in claim 1, fluid cooling means comprising;
a seal between said spindle and said body;
said body being sealed relative to said base;
said base having a fluid outlet conduct communicating with said bore of said body and said spindle
said base having a fluid inlet conduit;
said spindle having an inner end and an outer socket end;
said spindle having an axial opening leading from said inner end to said socket end;
a tube leading from said inlet conduit and extending through said spindle opening at least to said socket end;
said tube being smaller than said spindle opening to create a return channel therebetween from said socket end to said outlet conduit.

* * * * *